No. 689,403. Patented Dec. 24, 1901.
J. H. MARSHALL.
HARVESTER ATTACHMENT.
(Application filed May 11, 1901.)
(No Model.)
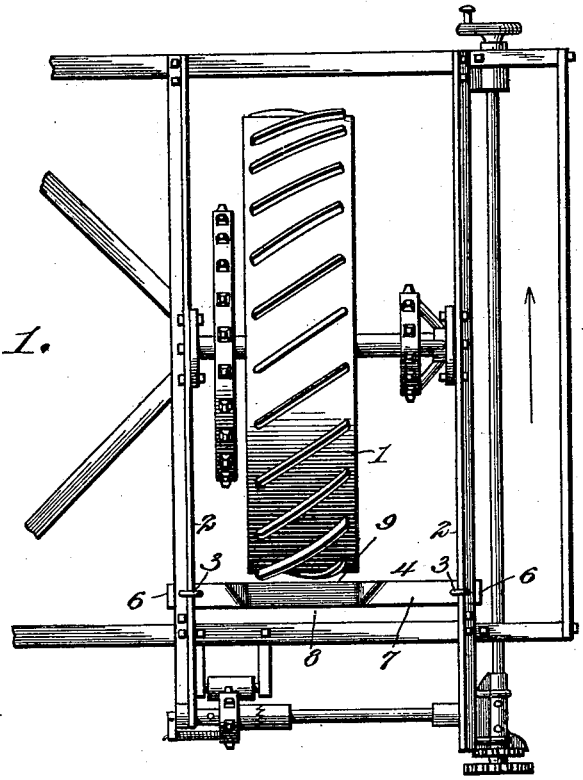
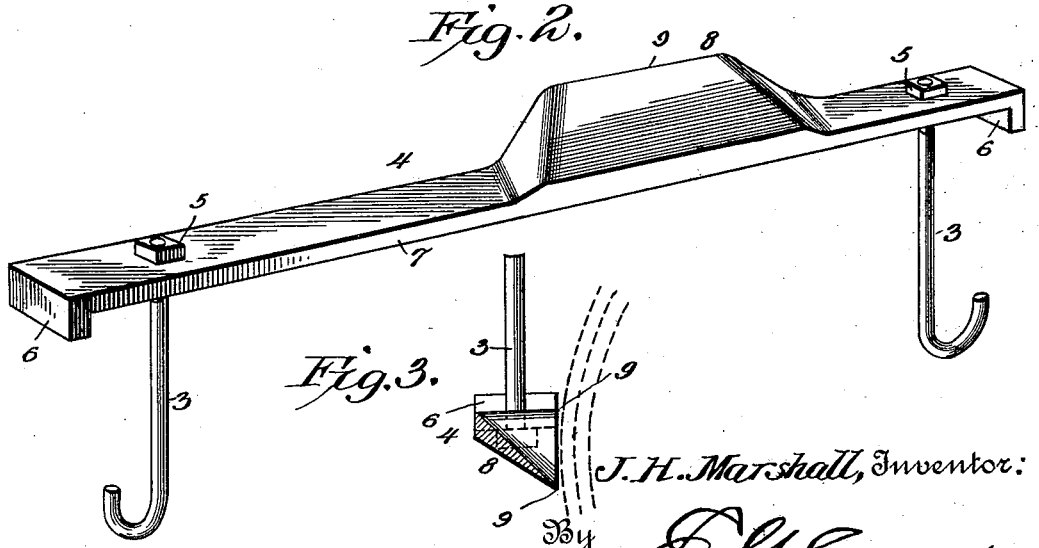
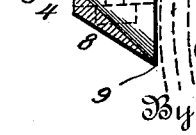
J. H. Marshall, Inventor:
Witnesses:

UNITED STATES PATENT OFFICE.

JOHN HENRY MARSHALL, OF BELTON, TEXAS.

HARVESTER ATTACHMENT.

SPECIFICATION forming part of Letters Patent No. 689,403, dated December 24, 1901.

Application filed May 11, 1901. Serial No. 59,846. (No model.)

*To all whom it may concern:*

Be it known that I, JOHN HENRY MARSHALL, a citizen of the United States, residing at Belton, in the county of Bell and State of Texas, have invented a new and useful Harvester Attachment, of which the following is a specification.

This invention relates to attachments for harvesters and mowing-machines, and more particularly to a device for keeping the drive-wheels of the machine free from accumulation of earth.

The object is to provide a simple and efficient device of the character specified by the use of which the harvester and other machines will be enabled to operate equally as well on soft muddy ground as on firm ground.

A further object is to provide a wheel scraping or cleaning attachment that shall combine simplicity of construction, efficiency, and durability in use, and readiness of application to use.

Further and more specific details of construction will be hereinafter more fully pointed out and claimed.

In the accompanying drawings, forming a part of this specification, and in which like numerals of reference indicate corresponding parts, I have shown one form of the embodiment of my invention as applied to a harvester-wheel, it being understood that the same ideas may be carried into effect in other ways without departing from the spirit of the invention, and in the drawings—

Figure 1 is a view in plan exhibiting the cleaner device as associated with the drive or master wheel of a harvester. Fig. 2 is a view in inverted perspective of the scraper detached. Fig. 3 is a view in transverse section taken through the scraping portion of the device, exhibiting more clearly the contour of the knife in cross-section.

Referring to the drawings, 1 designates the drive-wheel of a harvester, and 2 the main frame-beams. As these parts may be of the usual or any preferred construction detailed description of them is deemed unnecessary.

Secured to the beams 2 by hook-bolts 3 is the scraper attachment 4, the hook-bolts being passed over the top of the frame-beams and securely clamped there by nuts 5, carried by the lower ends of the bolts. Each end of the bar is formed or provided with an offset or lug 6, extending at right angles to the length of the attachment, these lugs being designed to bear against the frame-beams to prevent lateral motion of the attachment and to coact with the bolts 3 in holding the device securely in position. As will be apparent, these lugs will operate to remove a larger part of the strain from the bolts 3. The bar of metal 7 from which the attachment is constructed is preferably of steel and may be of any desired width and thickness and is provided at a point intermediate of its ends with an offset 8, constituting the scraper, this offset being formed by striking up a length of the metal at an angle to the face of the bar, as clearly shown in Fig. 3. In cross-section this offset is tapered, presenting at its scraping portion a knife-edge 9, this edge to be moved up as close to the periphery of the wheel as possible to allow it to clear the biting-ribs with which the drive-wheel of the harvester is provided. The edge of the scraper is made somewhat longer than the width of the wheel and is straight, and from its terminals the metal is curved downward and merges into the bar on the outer and inner surfaces of the bar. By reason of the fact that the scraper is pitched at an angle to the face of the bar there will be a space afforded in which the periphery of the wheel may work, thereby permitting the scraper to be moved up closely to the wheel, as before pointed out.

The outer surface of the scraper operates to deflect the dirt detached from the wheel and throw it to its rear, this being due to the fact that the scraper is located behind the wheel, with the scraping edge disposed downward. In this instance the attachment is bolted underneath the frame-beams with the lugs 6 projecting upward and the hooked portion of the bolts 3 bearing upon the upper side of the frame-beams; but should it be preferred to bolt the attachment on the upper side of the frame-beams it will only be necessary to have the lugs disposed downward and to bring the hooks of the bolts 3 into engagement with the under side of the frame-beams. As this latter arrangement will be readily understood, illustration is deemed unnecessary.

It will be observed by reference to Fig. 2 that the scraping edge is not arranged in the center of the length of the bar, this arrangement being rendered necessary from the fact that the bull-wheel of the harvester is not generally arranged centrally of the supporting-frame; but it is to be understood that I do not limit my invention to disposing the scraping edge to one side of the center of the length of the attachment, as it may be located in the center thereof and still be within the scope of the invention.

Instead of making the attachment of wrought-iron or steel to be struck up by suitable mechanism it may be made of cast-iron or steel. By reason of the fact that the hook-bolts are employed it will not necessitate any boring into the frame-beams of the machine to place it in position, as it will be seen from the drawings that the hook-bolts are simply passed over the frame-beams, or under the same, if preferred.

It has been found in practice that the strain imparted to a scraper of this character is considerable, especially where stones are carried up with the mud and become jammed in between the ribs of the wheel, so that it is necessary to attach the device securely to the frame-beams at both ends. By this arrangement a structure of sufficient rigidity to obviate damage from the strains applied to it in use will be presented.

This device from its extreme simplicity may be very cheaply made and can be added to the machine at the factory at a very small cost and so be made a part of the machine as put on the market; but, as pointed out, it may be supplied as a separate article of manufacture and attached to machines already on the market. It will be observed that the hooked fastenings project in the same direction as the shoulders 6, whereby the adjacent shoulders and hooks coöperate to form clamps for fastening the body of the scraper upon the frame.

The advantage of this attachment will be obvious. Where the ground is very muddy and an ordinary harvester could not be run, by adding this device to it the harvester can be operated without any trouble whatever, so that in use many hours of valuable time in the harvesting season that would have to be wasted on account of the condition of the ground will be saved.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what I claim is—

1. A wheel-scraper, comprising a body formed to scrape the periphery of a wheel, and having opposite transverse shoulders upon one side thereof, and opposite fastenings projected from the body in the same direction with the shoulders and adjustable with respect to the adjacent shoulders to form clamps for the attachment of the body.

2. A wheel-scraper, comprising a body having opposite terminal fasteners, and a scraper element which is offset to one side of the plane of the body and inclined transversely inward toward the rear of the body, the front edge of the scraper being formed into a sharp active edge disposed substantially longitudinally of the body.

3. A wheel-scraper, comprising a flat metal bar having opposite terminal transverse shoulders upon one side thereof, an intermediate scraper portion struck up and offset upon the opposite side of the bar, said struck-up portion being inclined transversely of the bar and having an outer active edge disposed longitudinally thereof, and fastenings projected from the bar in the direction of the shoulders and constructed to coöperate therewith and form opposite clamps for the attachment of the device.

4. A wheel-scraper, comprising a body having an intermediate scraper element, transverse shoulders lying at opposite sides of the scraper element, and fastening devices projected from the body in the direction of the shoulders, each fastening having an outer terminal hook projected toward the adjacent shoulder.

5. The combination with a harvester, of a scraper composed of a bar of metal having intermediate of its ends a scraping portion formed by striking up or otherwise forming the metal into an offset or projection pitched at an angle to the length of the bar and formed with a scraping edge, which merges into the body of the bar, means for holding the bar assembled with relation to the frame of the machine, and lugs or projections formed on the ends of the bar to bear against the sides of the frame.

In testimony that I claim the foregoing as my own I have hereto affixed my signature in the presence of two witnesses.

JOHN HENRY MARSHALL.

Witnesses:
L. A. BROOKS,
C. T. DENNY.